United States Patent [19]

King-Shui

[11] Patent Number: 5,597,086
[45] Date of Patent: Jan. 28, 1997

[54] MOISTUREPROOF TEA CONTAINER AND FOOD THERMOS

[76] Inventor: Tsai King-Shui, 15 Nan Huo Road, Wu-Kuai Village, Yuan-Chan Hsian, Yun Lin Hsien, Taiwan

[21] Appl. No.: 617,086

[22] Filed: Mar. 18, 1996

[51] Int. Cl.[6] ............................................. B65D 25/14
[52] U.S. Cl. ........................ 220/421; 220/412; 220/367.1; 220/630
[58] Field of Search .................................. 215/270, 311; 220/203.1, 203.4, 360, 361, 367.1, 412, 411, 410, 408, 23.83, 23.86, 400, 420, 421, 444, 452, 469, 630, 636, 729, 745, 212.5, 913, DIG. 27, 425

[56] References Cited

U.S. PATENT DOCUMENTS

| | | | |
|---|---|---|---|
| 646,459 | 4/1900 | Place | 220/421 |
| 1,016,346 | 2/1912 | Markee | 220/203.01 |
| 1,088,194 | 2/1914 | Whitton | 220/425 |
| 1,093,541 | 4/1914 | Craig | 220/412 |
| 2,315,425 | 3/1943 | Hill et al. | 220/425 |
| 2,960,250 | 11/1960 | Haloski | 220/412 |
| 3,310,193 | 3/1967 | MacPherson | 215/311 |
| 4,595,113 | 6/1986 | Fafflok et al. | 220/410 |
| 4,887,731 | 12/1989 | Pett et al. | 220/630 |
| 5,092,229 | 3/1992 | Chen | 220/203.4 |
| 5,390,809 | 2/1995 | Lin | 220/367.1 |

*Primary Examiner*—Stephen J. Castellano
*Attorney, Agent, or Firm*—Morton J. Rosenberg; David I. Klein

[57] ABSTRACT

Disclosed is a moistureproof tea container and food thermos being characterized in that an air vent is provided to the top cover of the container so that a pump can be used to evacuate most part of the air inside the container via the air vent, that an almost vacuumized clearance is left between the container and an inner container disposed therein, and that an interwall space is provided between an outer and an inner walls of the container and filled with heat insulation material, such that dried tea leaves stored in the container are not easily subject to moistures and will not become inferior in their taste. Moreover, the inner container can be used to contain hot food or drink in an almost vacuumized and well heat-insulated space for a prolonged time period. The container also has a bottom air vent from where any air or moisture in the interwall space of the container can be sucked out by means of a pump connected to the bottom air vent, so that the insulation performance of the container is further enhanced.

1 Claim, 6 Drawing Sheets

MOISTUREPROOF TEA CONTAINER AND FOOD THERMOS

BACKGROUND OF THE INVENTION

It is a popular way to store dried tea leaves by holding them directly in a tea caddy or similar container. Dried tea leaves stored in such caddy or container are, however, subject to moisture and accordingly, degraded quality and taste. To prevent the dried tea leaves from deteriorated quality, a sealable bag, such as a polybag, is usually used to contain the dried tea leaves before they are put into the caddy. However, such bag does not always provide a desired sealing and moistureproof effect to keep the dried tea leaves in their original good taste, because there is still large amount of air and therefore moisture existing in the sealed bag even though the bag is compressed to force out air before the bag is tightened. It is therefore desirable to have some container specifically created for storing the dried tea leaves while maintaining the same in good taste.

SUMMARY OF THE INVENTION

It is a primary object of the present invention to provide a moistureproof tea container to store the dried tea leaves lest they should be easily moistured and become inferior in their quality and taste.

Another object of the present invention is to provide a moistureproof tea container which can also be used as a food thermos into which hot food can be stored at unchanged temperature for a considerable time period.

BRIEF DESCRIPTION OF THE DRAWINGS

The above and other objects and structural features of the present invention can be best understood from the following detailed description of the preferred embodiment and the accompanying drawings, wherein.

DETAILED DESCRIPTION OF THE PREFERRED EMBODIMENT

Figure 1:
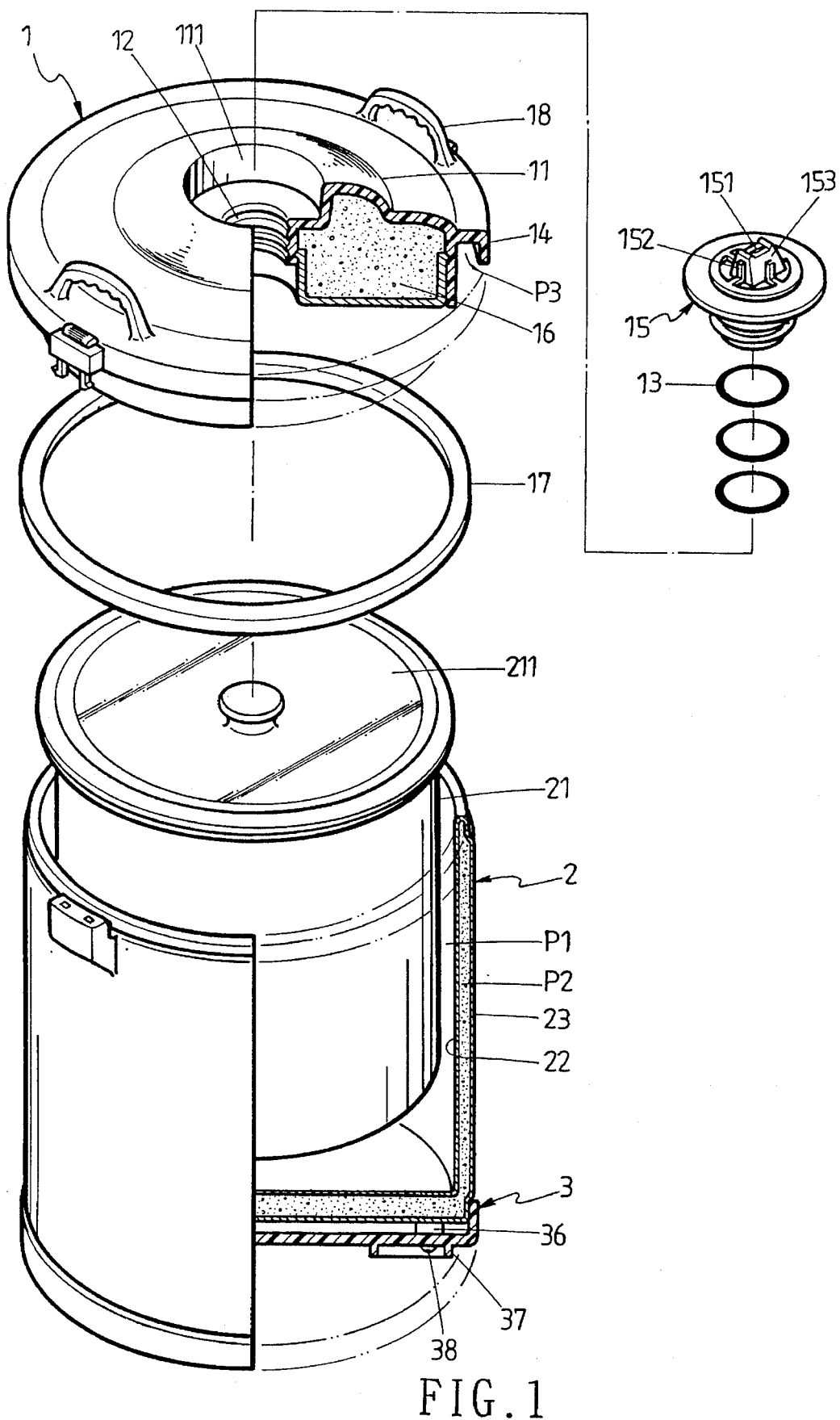
FIG. 1 is a disassembled perspective of the present invention, a part of which is cut away to better show the structure thereof.
Figure 2:
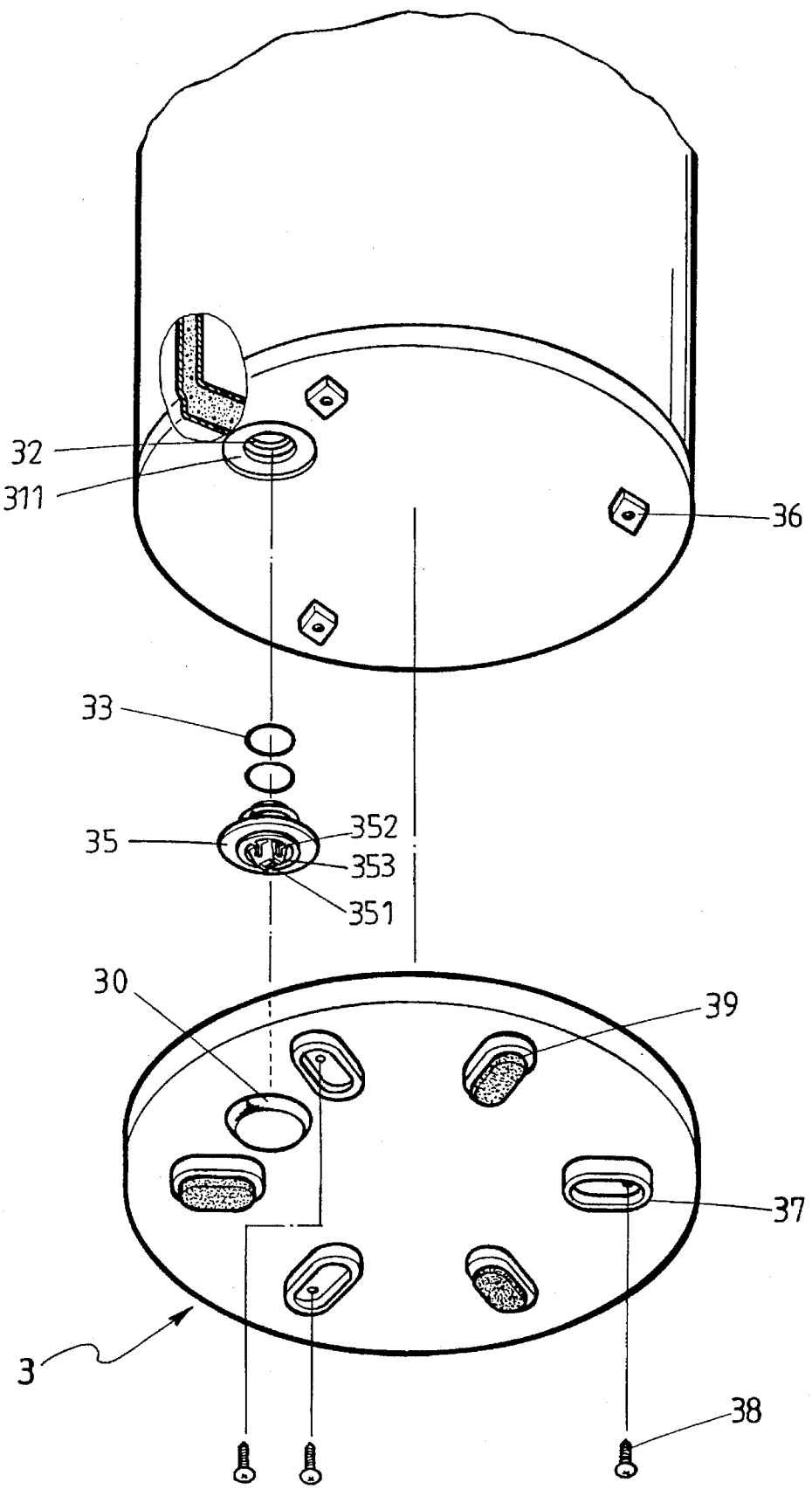
FIG. 2 is another fragmentary, disassembled perspective particularly showing the bottom structure of the present invention.
Figure 3:
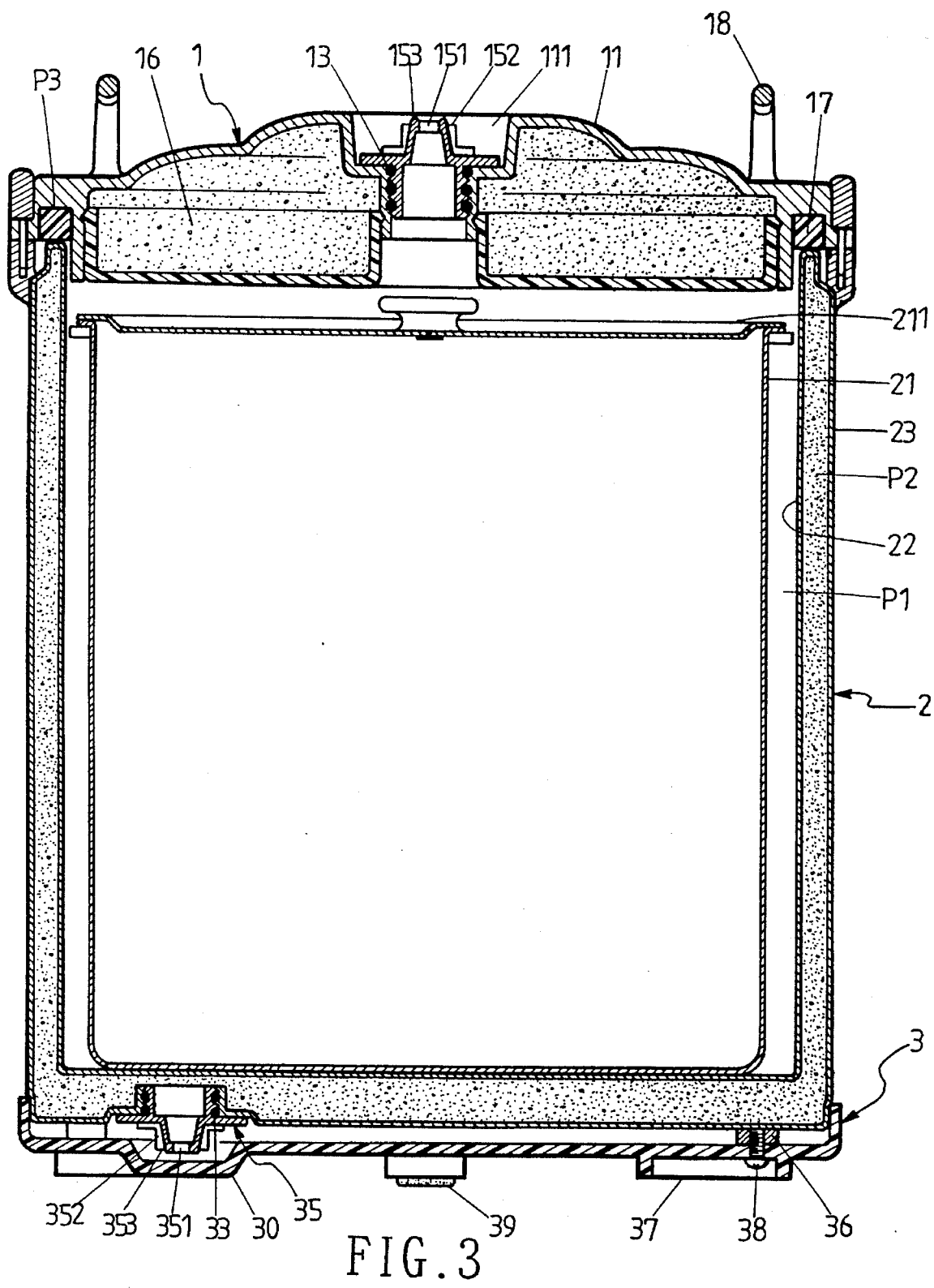
FIG. 3 is a vertical sectional view showing the present invention in an assembled state.

Please refer to FIGS. 1, 2 and 3. The present invention mainly includes a top cover 1, a container body 2, and a bottom cover 3.

Figure 4:
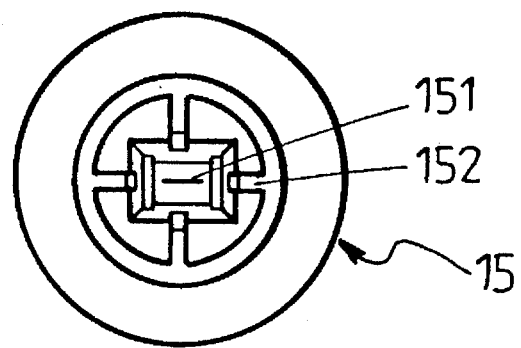
FIG. 4 is a top plan view of the air-vent plug of the present invention.

The top cover 1 is substantially a disc-shaped member with a slightly raised central portion which includes an annular seat 11 defining a hole 111 therein. The hole 111 is formed with several annular grooves 12 around its inner peripheral wall and each of such annular grooves 12 receives a seal ring 13 therein, so that a first air-vent plug 15 may be very tightly engaged into the hole 111. Please refer to FIG. 4, the first air-vent plug 15 is substantially an elastomeric cylindrical member having an air vent 153 projecting from a central portion of the plug 15. The air vent 153 has four equally spaced ribs 152 radially extending from a root portion thereof and a slit 151 provided at a top center of the air vent 153.

The top cover 1 has a downward extended flange 14 normal to an outer periphery of the cover 1. An annular chamber 16 is formed beneath the top cover 1 and filled with heat insulation material, such as PU. An outer wall of the chamber 16 and the flange 14 together define an annular groove P3 between them. Into the groove P3, a seal ring 17 is disposed. The top cover 1 is airtightly closed over the container body 2 with the help of the seal ring 17. Two handles 18 are symmetrically provided on a top surface of the top cover 1.

Figure 5:
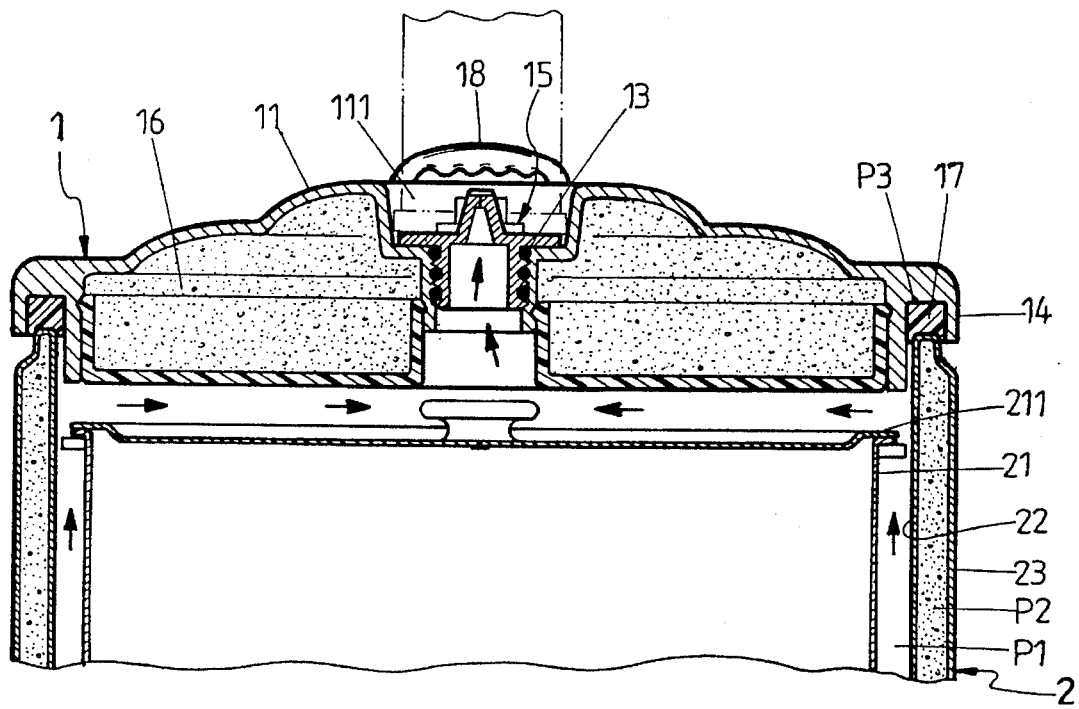
FIG. 5 illustrates the manner in which air in the container of the present invention is evacuated from the top air-vent plug thereof.
Figure 6:
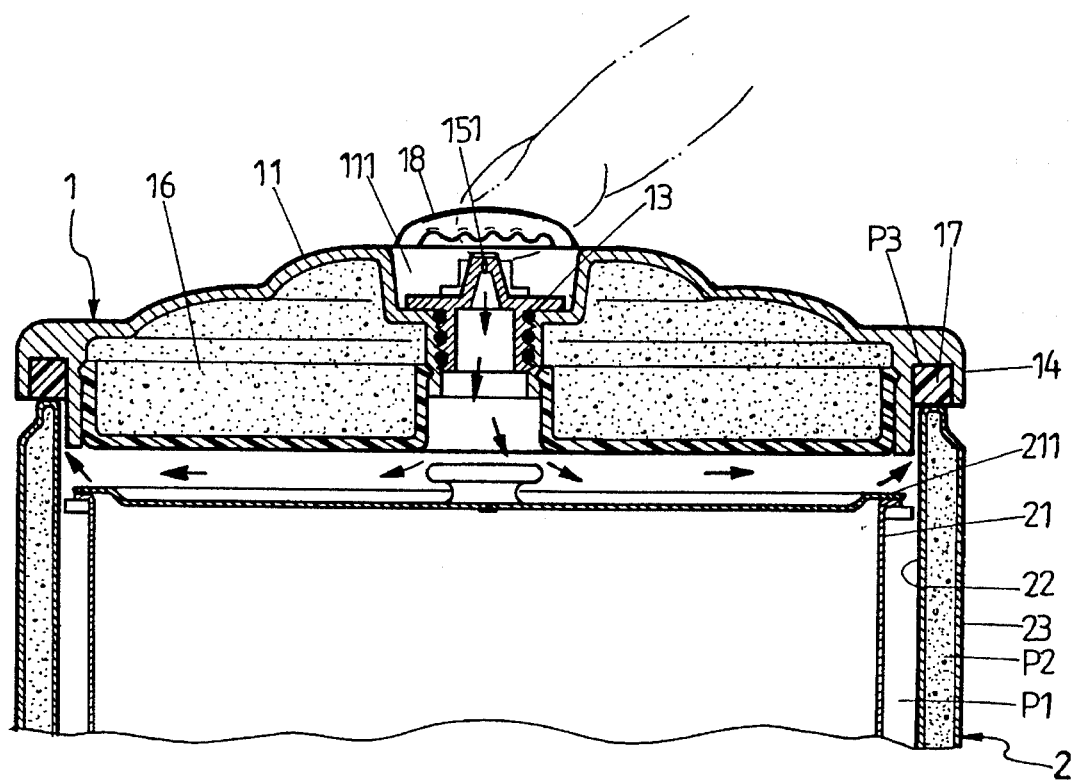
FIG. 6 illustrates the manner in which air is let into the container of the present invention via the top air-vent plug thereof.
Figure 7:
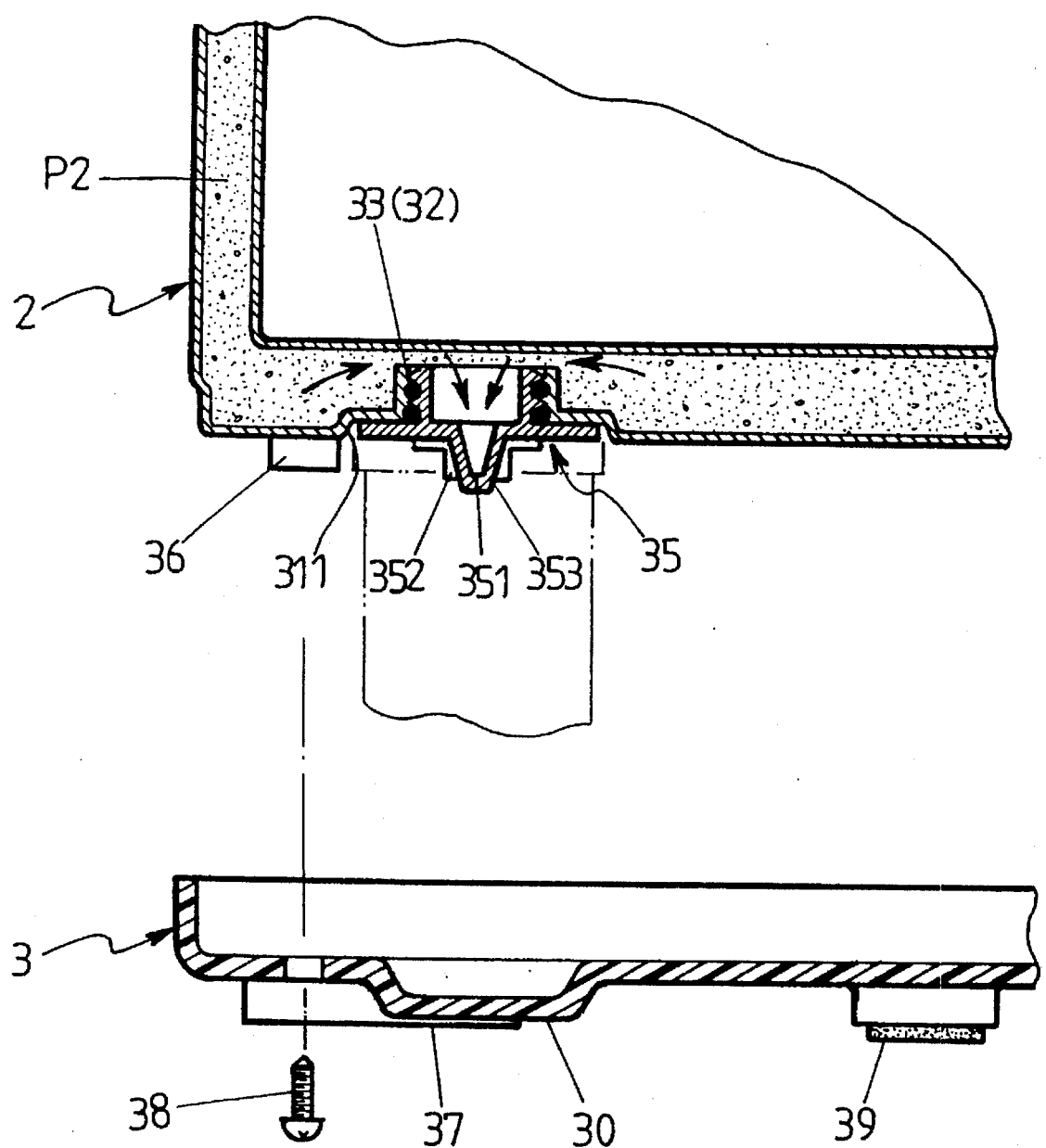
FIG. 7 illustrates the manner in which air in the container of the present invention is evacuated from the bottom air-vent plug thereof.

As shown in FIGS. 5 and 6, a pump can be used to evacuate air inside the container body 2 via the slit 151. Then, the air vent 153 is so squeezed that the slit 151 is forced to open wide to let in air, releasing the container body from a negative pressure state which is close to a vacuum condition.

The container body 2 is substantially a cylindrical body having an upward opening. Into the container body 2, an inner container 21 with a removable lid 211 is disposed, such that a clearance P1 is left between the inner container 21 and an inner wall 22 of the container body 2. An outer wall 23 of the container body 2 and the inner wall 22 thereof further define an interwall space P2 between them for filling heat insulation material, such as PU foaming plastic material.

Please now refer to FIG. 2. The container body 2 is provided at a bottom surface with a hole 311, an inner peripheral wall of which is formed with several annular grooves 32 for each accommodating a seal ring 33 therein, such that a second air-vent plug 35 is screwed to tightly engage into the hole 311. Like the first air-vent plug 15, the second air-vent plug 35 is substantially an elastomeric cylindrical member having an air vent 353 projecting from a central portion of the plug 35. The air vent 353 has four equally spaced ribs 352 radially extending from a root portion thereof and a slit 351 provided at a top center of the air vent 353.

The bottom cover 3 is substantially a disc member being covered to the bottom surface and a lower outer periphery of the container body 2. There are a plurality of screw seats 37 provided on the bottom cover 3 corresponding to a plurality of screw receivers 36 provided on the bottom surface of the container body 2, such that screws 38 can be used to tightly attach the bottom cover 3 to the container body 2. There are also a plurality of downward projected slip-resistant pads 39 provided to a bottom surface of the bottom cover 3 for the whole container to stably position on a desired place. And, a chamber 30 is formed on the bottom cover 3 to accommodate the downward projected air vent 353 of the second air-vent plug 35.

Since air is a heat conductor, an evacuation of air from a container shall permit the container to provide better heat insulation effect.

With this-in mind, the present invention is designed to be characterized in that air inside the tea container can be evacuated, and therefore, the container can also be used as a thermos to hold other hot foodstaff or drink in the inner container 21 with the lid 211 covered thereto. The heat insulation material filled in the interwall space P2 between the inner and outer walls 22, 23 of the container body 2, as well as the almost vacuumized clearance P1 between the inner wall 22 and the inner container 21 together slow down the conduction of stored heat in the container via air, and thereby, give the container better heat insulation effect.

Another advantage of the present invention lies in the negative pressure state inside the container body 2 formed by evacuating most part of air inside the container and thereby forming an almost vacuum condition. The negative pressure state causes the top cover 1 to be tightly sucked toward the container body 2 with the seal ring 17 tightly contacting with a top edge of the container body 2.

Since there is still possibility that air enters into the interwall space P2 and the PU material via tiny poses existed in the material forming the inner and the outer walls 22, 23, the bottom cover 3 may be removed from the container body 2 to expose the second air-vent plug 35 and, a pump can be used to suck any air in the space P2 out of there via the plug 35, lest the air in the space P2 should adversely affect the thermo insulation effect of the container.

Moreover, since air in the clearance P1 is almost evacuated, bacteria contained in the air decaying food are almost destroyed, too, the container can also be used to pickle food and provides prolonged term for preserving food.

What to be noted is the above embodiment is only used for illustrating the present invention, not intended to limit the scope thereof. Many modifications of the embodiment can be made without departing from the spirit of the present invention.

What is claimed is:

1. A moistureproof tea container and food thermos comprising top cover, a container body, and a bottom cover;

said top being a disc-like member having a raised central portion which includes an annular seat defining a hole therein, said hole being formed with several annular grooves around its inner peripheral wall and each of such annular grooves receiving a seal ring therein for a first air-vent plug to very tightly engage thereinto, said first air-vent plug being substantially an elastomeric cylindrical member having an air vent projecting from a central portion thereof, said air vent having four equally spaced ribs radially extending from a root portion thereof and a slit provided at a top center thereof; said top cover also having a downward extended flange normal to an outer periphery thereof and an annular chamber formed at underside of said top cover for filling with heat insulation material, such as PU, such that an outer wall of said annular chamber and said flange together define an annular groove between them for a seal ring to dispose therein, permitting said top cover to tightly contact with an upper edge of said container body; two handles being provided to a top surface of said top cover for easily handling the same;

said container body being substantially a cylindrical body having an upward opening into which an inner container with a removable lid is disposed, said container body and said inner container being so sized that a clearance is left between them; an outer wall and an inner wall of said container body further defining an interwall space between them for filling heat insulation material, such as PU foaming plastic material; said container body being provided at a bottom surface with a hole, an inner peripheral wall of said hole being formed with several annular grooves for each accommodating a seal ring therein, such that a second air-vent plug is tightly engaged into said hole; said second air-vent plug being substantially an elastomeric cylindrical member having an air vent projecting from a central portion thereof, and said air vent having four equally spaced ribs radially extending from a root portion thereof and a slit provided at a top center thereof; and said lower cover being substantially a disc member covered to said bottom surface and a lower outer periphery of said container body, said lower cover being provided with a plurality of screw seats corresponding to a plurality of screw receivers provided on said bottom surface of said container body, such that screws can be used to tightly attach said bottom cover to said container body, said lower cover also having a plurality of downward projected slip-resistant pads and a bottom chamber provided to a bottom surface thereof for accommodating said second air-vent plug.

* * * * *